UNITED STATES PATENT OFFICE.

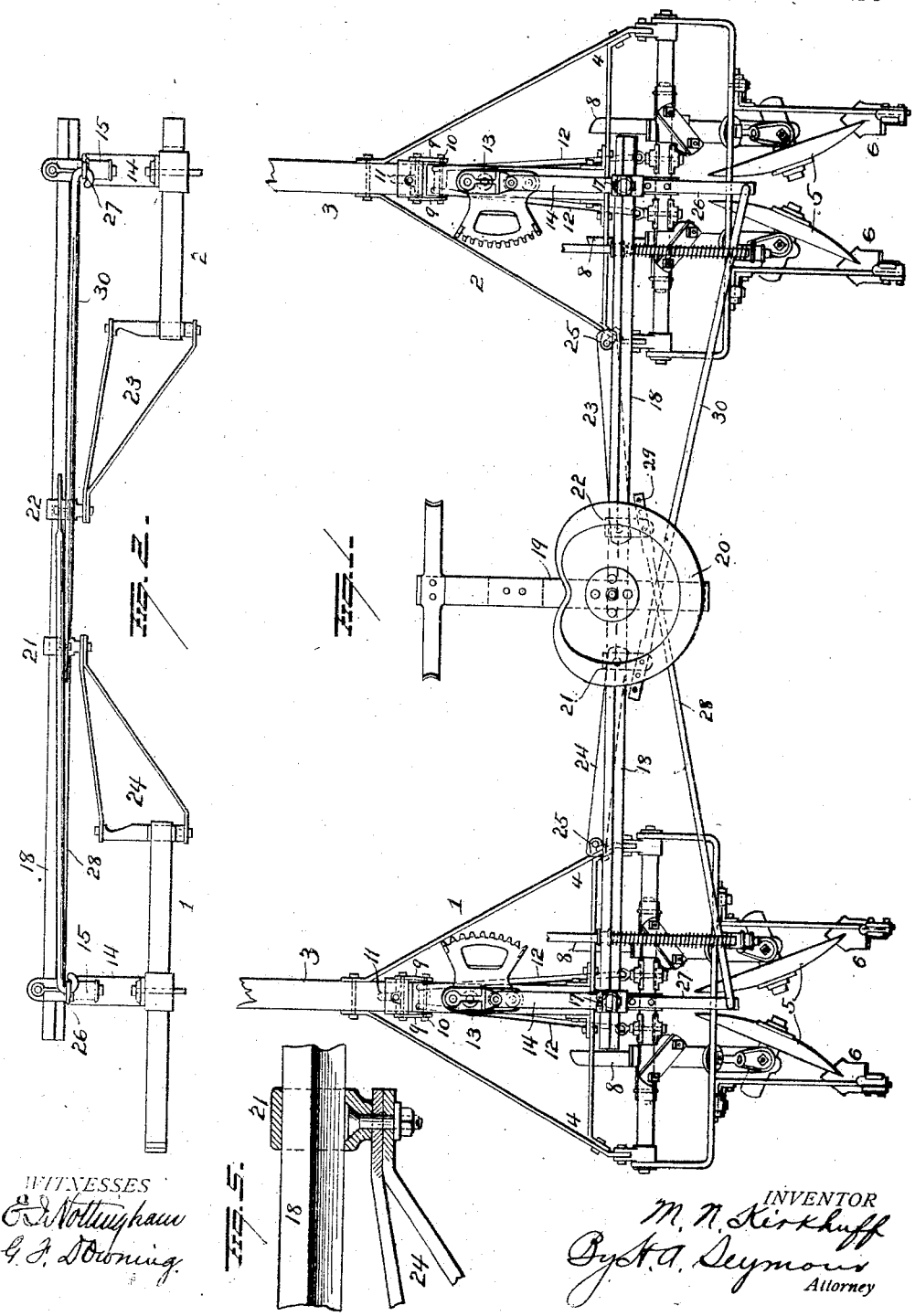

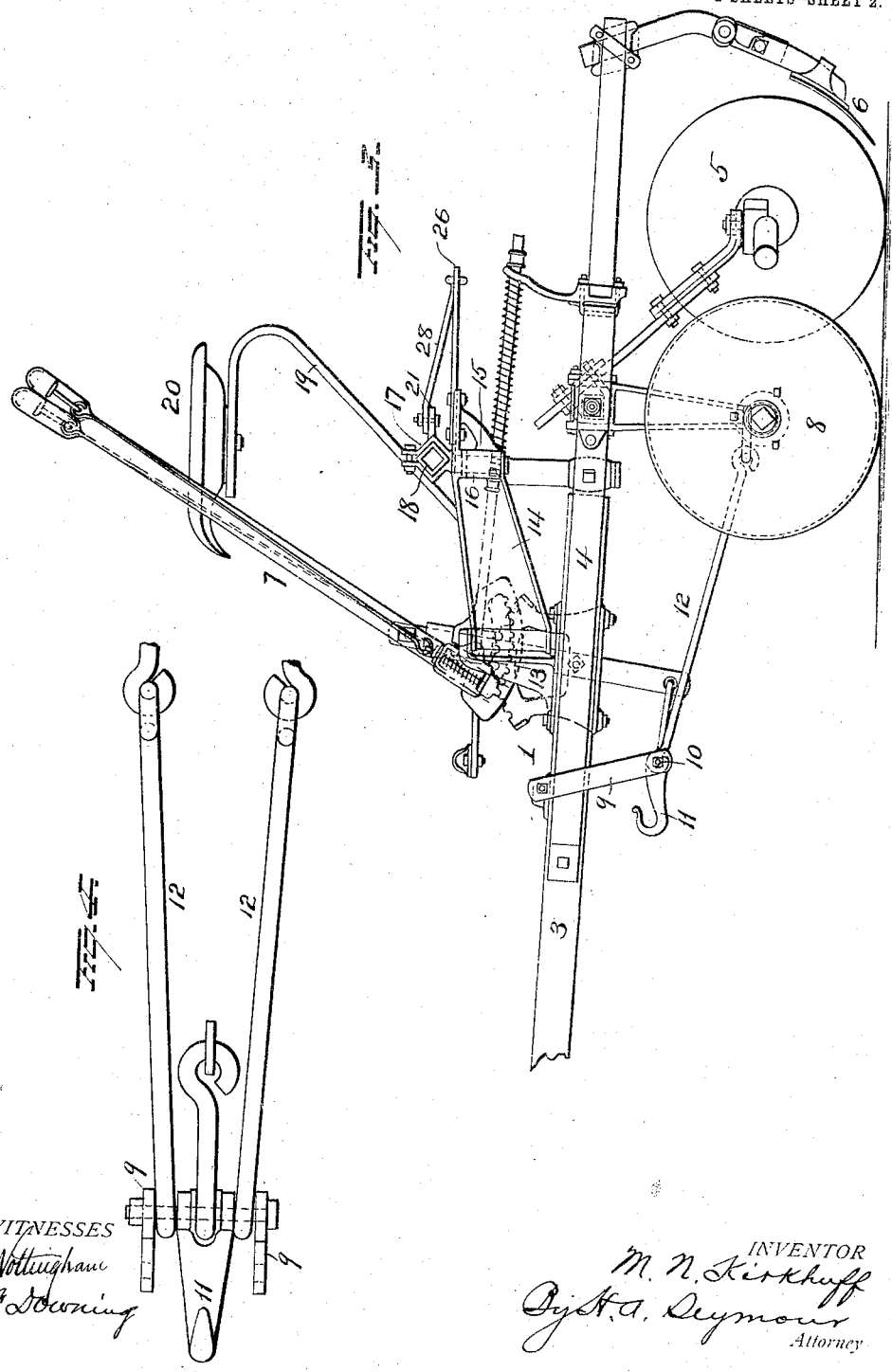

MARSHALL N. KIRKHUFF, OF SOUTH BEND, INDIANA, ASSIGNOR TO OLIVER CHILLED PLOW WORKS, OF SOUTH BEND, INDIANA.

CULTIVATOR.

1,025,749.  Specification of Letters Patent.  Patented May 7, 1912.

Application filed November 10, 1911. Serial No. 659,614.

*To all whom it may concern:*

Be it known that I, MARSHALL N. KIRKHUFF, a citizen of the United States, residing at South Bend, in the county of St. Joseph and State of Indiana, have invented certain new and useful Improvements in Cultivators; and I do hereby declare the following to be a full, clear, and exact description of the invention, such as will enable others skilled in the art to which it appertains to make and use the same.

This invention relates to improvements in lister cultivators and more particularly to such as comprise a plurality of relatively movable cultivator sections or members coupled together and provided with a seat disposed between the cultivator sections or members.

The object of my present invention is to provide simple and efficient means whereby an operator's seat will be so supported between two cultivator sections or members capable of relative lateral movement to accommodate themselves to irregularities of rows, that said seat shall always be disposed centrally between said cultivator sections or members.

With this object in view the invention consists in certain novel features of construction and combinations of parts as hereafter set forth and pointed out in the claims.

In the accompanying drawings, Figure 1 is a plan view of a lister cultivator embodying my improvements. Fig. 2 is a rear elevation showing the spreading devices. Fig. 3 is a side elevation of the cultivator. Fig. 4 is a detail view showing draft devices, and Fig. 5 is an enlarged detail view showing one of the connections between the connecting bar and spreading devices.

1—2 represent two cultivator members or sections, each embodying in its construction, a complete cultivator, and these are connected together and relatively movable laterally, as presently explained, to facilitate the spreading of the cultivator members and cause them to adapt themselves to irregularities of the rows to be cultivated.

The details of construction of each of the cultivator members is the same and hence a description of one will suffice for the other.

3 represents a tongue or pole, with which a cultivator frame 4 is connected and with this cultivator frame, disks 5 and shovels 6 are connected. Suitable means are provided for raising and lowering the disks and shovels and these means are manipulated by the operation of a lever 7. The cultivator frame will be sustained by wheels 8. Links 9 depend from the tongue and support a transverse bolt 10 with which a draft hook 11 is connected and the said bolt 10 is also connected, by means of rods 12 with the wheeled cultivator frame.

A bracket 13 is mounted upon the pole or tongue in advance of the major portion of the cultivator frame and in this bracket, the forward end of an arm 14 is pivotally supported. From its connection with the tongue, the arm 14 extends rearwardly and somewhat upwardly. At its rear end the arm 14 is formed with a bracket 15 having a socket 16 which receives the pintle of a clamp 17. The clamp 17 connected with the arm 14 of each cultivator member receives a transverse bar 18 (preferably angular in cross section) which extends from one cultivator member to the other and to this bar, the clamps 17 of the two cultivator member arms are secured. Thus it will be seen that the part 18 constitutes a connecting bar for the two cultivator members and that said cultivator members have swinging connection with said connecting bar through the medium of the pivoted arms 14.

The connecting bar 18 carries, centrally between its ends, the post 19 of a seat 20,— said seat being thus located permanently centrally between the cultivator members and such central location is maintained when the cultivator members are swung, by reason of the devices which will now be explained.

Adjacent to respective sides of the seat post 19, slides 21—22 are mounted upon the connecting bar 18 and with these slides, triangular frames 23—24 are pivotally connected. The triangular frames 23—24 are located in a plane below that of the connecting bar 18 and depend sufficiently to reach the plane of the respective cultivator frames, with which they are pivotally connected as at 25. To the brackets 15 at the rear ends of the arms 14, rearwardly projecting arms 26—27 are secured and may be of sufficient length to extend slightly beyond the rear ends of the respective cultivator frames. A rod 28 is pivotally connected at one end with the rear end of the arm 27 and the other end of this rod is provided with a plurality of holes 29 whereby it can be adjustably and pivotally connected with the slide 22 on the connecting bar 18. The slide 21 is similarly connected, by means of a rod 30 with the rear end of the arm 26 of the cultivator member 2.

From the construction and arrangement of parts above described it will be apparent that the respective cultivator members can swing relatively to their tongues; that by reason of the connections between the cultivator members and the connecting bar and between each other, the two cultivator members will move in unison and the cultivator as a whole will be caused to spread or contract and thus adapt itself to irregularities of the rows being cultivated and it will also be seen that the seat will always be located centrally between the cultivator members. Thus, if the cultivator 2 should move to the left, motion will be transmitted by frame 23 to slide 22 and the latter, moving on bar 18 toward the seat post, will move rod 28 longitudinally to move arm 27 to the left and the arm or bracket 14 (of cultivator 1) to the right, the latter turning on its pivotal connection with the bar 18. As the forward end of this arm or bracket is pivoted to the frame of cultivator 1, the latter will move to the right and tend to impart motion, through frame 24, slide 21 and rod 30, to arm 26 of cultivator 2, thus permitting the arm or bracket 14 of cultivator 2 to turn on its pivotal connections with the bar 18 and said cultivator 2 and allowing the latter to move to the left. Thus the inward or outward movement of the two cultivators will be accomplished simultaneously.

Having fully described my invention what I claim as new and desire to secure by Letters-Patent is,—

1. In a lister cultivator, the combination with two cultivator members spaced apart, and a connecting bar, of an arm pivotally connected to each of said cultivator members and having pivotal connection with said connecting bar, and movable connections between the rear end of the pivotal arm of one cultivator member and the frame of the other cultivator member.

2. In a lister cultivator, the combination with two cultivator members spaced apart, a connecting bar extending from one cultivator member to the other, and a seat having fixed connection with said bar centrally between the cultivator members, of an arm pivoted at one end to each cultivator member and having pivotal connection with the connecting bar, each of said arms having an extension rearwardly beyond its pivotal connection with the connecting bar, and movable connections between the rearward extension of one of said pivoted arms and the cultivator frame with which the other pivoted arm is connected.

3. In a lister cultivator, the combination with two cultivator members spaced apart, and a bar extending from one cultivator member to the other, of arms pivotally connected at their forward ends with the respective cultivator members and having pivotal connection with the connecting bar, each of said arms provided with a member extending rearwardly from the pivotal connection of the arm with the connecting bar, slides mounted on said connecting bar, connections between said slides and the respective cultivator members, and rods pivotally connected with said slides and connecting the same with the rearward extensions of said pivoted arm.

4. In a lister cultivator, the combination with two cultivator members spaced apart, and a connecting bar extending from one member to the other, of an arm mounted upon each cultivator member and pivotally connected at its forward end therewith, pivotal connections between said arms and the connecting bar, extensions projecting rearwardly from the pivoted arms, a seat post secured to said connecting bar centrally between its ends, slides mounted on the connecting bar at respective sides of the seat post, connecting devices located in a plane below that of the connecting bar, said connecting devices pivotally connected at one end with the slides and at the other end with the frames of the cultivator members, and crossed rods connecting said slides with the rearward extensions of the pivoted arms of the respective cultivator members.

In testimony whereof, I have signed this specification in the presence of two subscribing witnesses.

MARSHALL N. KIRKHUFF.

Witnesses:
 EDWIN NICOR,
 R. O. MORGAN.